(12) United States Patent
Kodaira

(10) Patent No.: US 12,512,210 B2
(45) Date of Patent: Dec. 30, 2025

(54) MEDICAL IMAGE DISPLAY APPARATUS, METHOD, AND PROGRAM

(71) Applicant: FUJIFILM CORPORATION, Tokyo (JP)

(72) Inventor: Shunsuke Kodaira, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 636 days.

(21) Appl. No.: 17/821,477

(22) Filed: Aug. 23, 2022

(65) Prior Publication Data

US 2023/0102418 A1 Mar. 30, 2023

(30) Foreign Application Priority Data

Sep. 28, 2021 (JP) ................. 2021-158221

(51) Int. Cl.
G16H 30/40 (2018.01)
G16H 30/20 (2018.01)

(52) U.S. Cl.
CPC ............ G16H 30/40 (2018.01); G16H 30/20 (2018.01)

(58) Field of Classification Search
CPC ........ G16H 30/40; G16H 30/20; G16H 40/63; A61B 6/463; A61B 5/00; G09G 5/14; G09G 2380/08
See application file for complete search history.

(56) References Cited

U.S. PATENT DOCUMENTS

| | | | | |
|---|---|---|---|---|
| 10,140,421 B1 * | 11/2018 | Bernard | .................. | G16H 10/60 |
| 11,210,785 B1 * | 12/2021 | Douglas | .................. | G06V 40/19 |
| 12,040,075 B2 * | 7/2024 | Kalafut | .................. | G16H 50/70 |
| 2003/0179915 A1 | 9/2003 | Goto | | |
| 2004/0151358 A1 * | 8/2004 | Yanagita | ............... | G06T 7/0012 |
| | | | | 382/132 |
| 2007/0174769 A1 * | 7/2007 | Nycz | .................. | G06F 3/04845 |
| | | | | 715/700 |
| 2012/0109986 A1 * | 5/2012 | Palermiti | .............. | G06F 16/248 |
| | | | | 707/E17.069 |

(Continued)

FOREIGN PATENT DOCUMENTS

| | | | |
|---|---|---|---|
| JP | 2002-325761 A | 11/2002 | |
| JP | 2005-081056 A | 3/2005 | |

(Continued)

OTHER PUBLICATIONS

English language translation of the following: Office action dated Feb. 4, 2025 from the JPO in a Japanese patent application No. 2021-158221 corresponding to the instant patent application. This office action translation is submitted now in order to supplement the understanding of the cited references which are being disclosed in the instant Information Disclosure Statement.

(Continued)

*Primary Examiner* — Cindy Trandai
(74) *Attorney, Agent, or Firm* — SOLARIS Intellectual Property Group, PLLC

(57) ABSTRACT

A processor displays a medical image, acquires an analysis result for the medical image, and based on reference information indicating whether or not the analysis result has been referenced by a user, in a case where the analysis result has been referenced and an instruction to display the medical image is given, displays an annotation representing the analysis result in addition to the instructed medical image.

10 Claims, 16 Drawing Sheets

(56) References Cited

U.S. PATENT DOCUMENTS

| | | | |
|---|---|---|---|
| 2013/0290826 A1* | 10/2013 | Niwa | G16H 30/20 |
| | | | 715/230 |
| 2016/0206273 A1* | 7/2016 | Fukuda | A61B 6/463 |
| 2016/0224737 A1 | 8/2016 | Okabe et al. | |
| 2017/0006231 A1* | 1/2017 | Mori | G11B 27/3027 |
| 2017/0212665 A1* | 7/2017 | Ogasawara | G06F 3/04845 |
| 2018/0137244 A1* | 5/2018 | Sorenson | A61B 8/565 |
| 2019/0267132 A1* | 8/2019 | Fuchigami | G06T 11/60 |
| 2020/0042794 A1* | 2/2020 | Ishikawa | G06V 20/64 |
| 2020/0074224 A1* | 3/2020 | Hayashi | G06V 10/945 |
| 2020/0194110 A1* | 6/2020 | Mankovich | G16H 50/70 |
| 2020/0342964 A1* | 10/2020 | Shimada | G16H 50/20 |
| 2021/0202071 A1* | 7/2021 | Mitsumori | G16H 40/20 |
| 2021/0280300 A1* | 9/2021 | Hikosaka | A61B 6/00 |
| 2022/0084200 A1* | 3/2022 | Chung | G16H 50/20 |
| 2022/0101048 A1* | 3/2022 | Tan | G16H 50/20 |
| 2022/0360613 A1* | 11/2022 | Papisetty | H04L 65/403 |
| 2022/0392127 A1* | 12/2022 | Liu | G06T 7/0012 |
| 2023/0225681 A1* | 7/2023 | Ichinose | G16H 50/20 |
| | | | 382/128 |
| 2024/0394967 A1* | 11/2024 | Schattel | G06T 17/00 |

FOREIGN PATENT DOCUMENTS

| | | |
|---|---|---|
| JP | 2006-115921 A | 5/2006 |
| JP | 2011-097983 A | 5/2011 |
| JP | 2011-115265 A | 6/2011 |
| JP | 2013-041428 A | 2/2013 |
| JP | 2016-143205 A | 8/2016 |
| WO | 2011/132468 A1 | 10/2011 |
| WO | 2020/129385 A1 | 6/2020 |

OTHER PUBLICATIONS

English language translation of the following: Office action dated May 13, 2025 from the JPO in a Japanese patent application No. 2021-158221 corresponding to the instant patent application. This office action translation is submitted now in order to supplement the understanding of the cited references which are being disclosed in the instant Information Disclosure Statement.

\* cited by examiner

| IMG0001.jpg | | |
|---|---|---|
| RADIOLOGIST ID | REFERENCE INFORMATION | REFERENCE DATE |
| ABC1234 | REFERENCED | 8/31/2021 |
| DEF6789 | UNREFERENCED | |

| | IMG0002.jpg | | | |
|---|---|---|---|---|
| | GROUP | RADIOLOGIST ID | REFERENCE INFORMATION | REFERENCE DATE |
| 55 → | 1 | ABCD1234 | UNREFERENCED | |
| | | EFGH6789 | UNREFERENCED | |
| | | XYZA1357 | REFERENCED | 8/31/2021 |
| | | PQRS2468 | REFERENCED | 9/3/2021 |

| RADIOLOGIST ID | FILE NAME | REFERENCE INFORMATION | REFERENCE DATE | SET VALUE |
|---|---|---|---|---|
| ABC1234 | IMG0001.jpg | REFERENCED | 8/31/2021 | HIDDEN |

MEDICAL IMAGE DISPLAY APPARATUS, METHOD, AND PROGRAM

CROSS REFERENCE TO RELATED APPLICATIONS

The present application claims priority under 35 U.S.C. § 119 to Japanese Patent Application No. 2021-158221, filed on Sep. 28, 2021. The above application is hereby expressly incorporated by reference, in its entirety, into the present application.

BACKGROUND

Technical Field

The present disclosure relates to a medical image display apparatus, method, and program.

Related Art

In recent years, advances in medical devices, such as computed tomography (CT) apparatuses and magnetic resonance imaging (MRI) apparatuses, have enabled image diagnosis using high-resolution medical images with higher quality. In particular, since a region of a lesion can be accurately specified by image diagnosis using CT images, MM images, and the like, appropriate treatment is being performed based on the specified result.

In addition, image diagnosis is made by analyzing a medical image via computer-aided diagnosis (CAD) using a learning model in which machine learning is performed by deep learning or the like, and detecting abnormal shadows such as a lesion included in the medical image from the medical image. In this way, the analysis result generated by the analysis process via CAD is saved in a database in association with examination information, such as a patient name, gender, age, and a modality which has acquired a medical image, and provided for diagnosis. A doctor interprets a medical image by referring to a distributed medical image and analysis result in his or her own interpretation terminal. At this time, a radiologist adds annotations to abnormal shadows included in the medical image based on the interpretation result. For example, a region surrounding the abnormal shadow, a mark such as an arrow indicating the abnormal shadow, text indicating the type and size of the disease, and the like are added as annotations. In addition, at the time of referring to the analysis result, an annotation representing the analysis result is displayed on the medical image.

On the other hand, the interpretation of the medical image by the doctor should not be guided by the analysis result via CAD. Therefore, the analysis result of the medical image via CAD is often used as a secondary interpretation (second reading) in the clinical field. For example, at the time of interpretation, the doctor first performs a primary interpretation of the medical image without referring to the analysis result via CAD, and adds an annotation representing the interpretation result to the medical image. After that, the medical image to which the annotation is added based on the analysis result via CAD is displayed, and the doctor performs the secondary interpretation of the medical image while referring to the annotation representing the analysis result. By performing such primary and secondary interpretations, it is possible to prevent the diseased region from being overlooked.

In JP2006-115921A, a method has been proposed in which an analysis result via CAD and an interpretation result by a doctor are displayed in a superimposed manner or the analysis result and the interpretation result are displayed in parallel after a primary interpretation performed by the doctor is completed. Specifically, in a case where the sign of the completion of interpretation performed by the doctor is input, or in a case where the medical image is displayed for a prescribed time or longer, it is determined that the interpretation is completed and the analysis result via CAD is displayed.

The interpretation result of the medical image on which the analysis result via CAD is displayed may be influenced by the analysis result via CAD. Therefore, for medical images for which the analysis result via CAD has already been displayed, the work of receiving a display instruction each time a CAD result is displayed or displaying a medical image for a prescribed time or longer is very complicated for a doctor.

SUMMARY OF THE INVENTION

The present disclosure has been made in view of the above circumstances, an object thereof is to make it possible to display an analysis result for a medical image without performing the work of receiving a display instruction every time the analysis result is displayed or displaying the medical image for a prescribed time or longer.

According to an aspect of the present disclosure, there is provided a medical image display apparatus comprising at least one processor, in which the processor is configured to display a medical image, acquire an analysis result for the medical image, based on reference information indicating whether or not the analysis result has been referenced by a user, in a case where the analysis result has been referenced and an instruction to display the medical image is given, display an annotation representing the analysis result in addition to the instructed medical image.

In the medical image display apparatus according to the aspect of the present disclosure, the reference information may be managed in a unit of a user.

In the medical image display apparatus according to the aspect of the present disclosure, the reference information may be further managed in a unit of a group including a plurality of users.

In this case, the processor may be configured to, in a case where an instruction to display a medical image to which the analysis result has been referenced for all the users included in the group is given by the user included in the group, display the annotation representing the analysis result in addition to the instructed medical image, and in a case where an instruction to display a medical image to which the analysis result is unreferenced for at least one user included in the group is given by the user included in the group, display only the instructed medical image.

In the medical image display apparatus according to the aspect of the present disclosure, the processor may be configured to display whether or not the analysis result has been referenced for the medical image to be displayed in a visually recognizable manner.

In the medical image display apparatus according to the aspect of the present disclosure, the processor may be configured to, for the referenced analysis result, manage a set value indicating whether or not to display the analysis result even though there is no instruction to display the analysis result in a case where the user next displays the medical image, in a case where the analysis result is set to be displayed by the set value, display the annotation representing the analysis result in addition to the medical image in a case where the user next displays the medical image, and in a case where the analysis result is set to be hidden by the set value, display only the medical image in a case where the user next displays the medical image.

In this case, the set value may be managed in a unit of a user.

According to another aspect of the present disclosure, there is provided a medical image display method comprising: displaying a medical image; acquiring an analysis result for the medical image; and based on reference information indicating whether or not the analysis result has been referenced by a user, in a case where the analysis result has been referenced and an instruction to display the medical image is given, displaying an annotation representing the analysis result in addition to the instructed medical image.

In addition, a program for causing a computer to execute the medical image display method according to the aspect of the present disclosure may be provided.

According to the aspects of the present disclosure, it is possible to display an analysis result for a medical image without performing the work of receiving a display instruction every time the analysis result is displayed or displaying the medical image for a prescribed time or longer.

DETAILED DESCRIPTION

Figure 1:
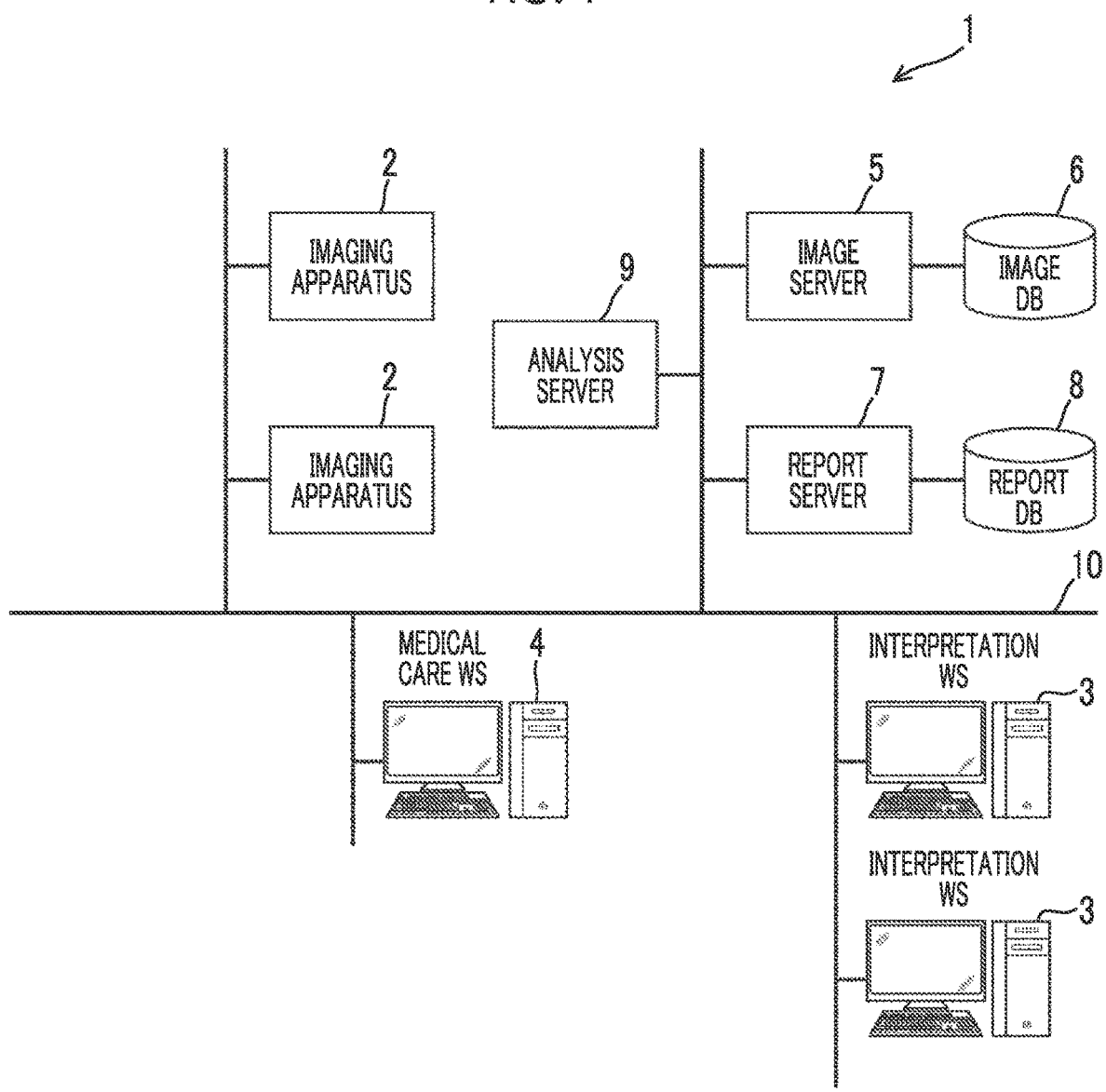
FIG. 1 is a diagram showing a schematic configuration of a medical information system to which a medical image display apparatus according to an embodiment of the present disclosure is applied.

Hereinafter, embodiments of the present disclosure will be described with reference to the drawings. First, a configuration of a medical information system 1 to which a medical image display apparatus according to the present embodiment is applied will be described. FIG. 1 is a diagram showing a schematic configuration of the medical information system 1. The medical information system 1 shown in FIG. 1 is, based on an examination order from a doctor in a medical department using a known ordering system, a system for imaging an examination target part of a subject, storing a medical image acquired by the imaging, interpreting the medical image by a radiologist and creating an interpretation report, and viewing the interpretation report and observing the medical image to be interpreted in detail by the doctor in the medical department that is a request source.

As shown in FIG. 1, in the medical information system 1, a plurality of imaging apparatuses 2, a plurality of interpretation workstations (WSs) 3 that are interpretation terminals, a medical care WS 4, an image server 5, an image database (hereinafter referred to as an image DB) 6, a report server 7, a report database (hereinafter referred to as a report DB) 8, and an analysis server 9 are communicably connected to each other through a wired or wireless network 10.

Each apparatus is a computer on which an application program for causing each apparatus to function as a component of the medical information system 1 is installed. The application program is stored in a storage apparatus of a server computer connected to the network 10 or in a network storage in a state in which it can be accessed from the outside, and is downloaded to and installed on the computer in response to a request. Alternatively, the application program is recorded on a recording medium, such as a digital versatile disc (DVD) and a compact disc read only memory (CD-ROM), and distributed, and is installed on the computer from the recording medium.

The imaging apparatus 2 is an apparatus (modality) that generates a medical image showing a diagnosis target part of the subject by imaging the diagnosis target part. Specifically, examples of the modality include a simple X-ray imaging apparatus, a CT apparatus, an MM apparatus, a positron emission tomography (PET) apparatus, and the like. The medical image generated by the imaging apparatus 2 is transmitted to the image server 5 and is saved in the image DB 6. The simple X-ray imaging apparatus is an apparatus that acquires a two-dimensional radiation image, which is a transmitted image of a subject, by irradiating the subject with radiation once.

The interpretation WS 3 is a computer used by, for example, a radiologist of a radiology department to interpret a medical image and to create an interpretation report, and encompasses a medical image display apparatus 20 according to the present embodiment. In the interpretation WS 3, a viewing request for a medical image to the image server 5, various image processing for the medical image received from the image server 5, display of the medical image, input reception of comments on findings regarding the medical image, and the like are performed. In the interpretation WS 3, creation of an interpretation report, a registration request and a viewing request for the interpretation report to the report server 7, display of the interpretation report received from the report server 7, and the like are performed. The above processes are performed by the interpretation WS 3 executing software programs for respective processes.

The medical care WS 4 is a computer used by a doctor in a medical department to observe an image in detail, view an interpretation report, create an electronic medical record, and the like, and is configured to include a processing apparatus, a display apparatus such as a display, and an input apparatus such as a keyboard and a mouse. In the medical care WS 4, a viewing request for the image to the image server 5, display of the image received from the image server 5, a viewing request for the interpretation report to the report server 7, and display of the interpretation report received from the report server 7 are performed. The above processes are performed by the medical care WS 4 executing software programs for respective processes.

The image server 5 is a general-purpose computer on which a software program that provides a function of a database management system (DBMS) is installed. The image server 5 comprises a storage in which the image DB 6 is configured. This storage may be a hard disk apparatus connected to the image server 5 by a data bus, or may be a disk apparatus connected to a storage area network (SAN) or a network attached storage (NAS) connected to the network 10. In a case where the image server 5 receives a request to register a medical image from the imaging apparatus 2, the image server 5 prepares the medical image in a format for a database and registers the medical image in the image DB 6.

Image data of the medical image acquired by the imaging apparatus 2 and accessory information are registered in the image DB 6. The accessory information includes, for example, an image identification (ID) for identifying each medical image, a patient ID for identifying a subject, an examination ID for identifying an examination, a unique ID (unique identification (UID)) allocated for each medical image, examination date and examination time at which a medical image is generated, the type of imaging apparatus used in an examination for acquiring a medical image, patient information such as the name, age, and gender of a patient, an examination part (an imaging part), imaging information (an imaging protocol, an imaging sequence, an imaging method, imaging conditions, the use of a contrast medium, and the like), and information such as a series number or a collection number in a case where a plurality of medical images are acquired in one examination.

In addition, in a case where the viewing request from the interpretation WS 3 and the medical care WS 4 is received through the network 10, the image server 5 searches for a medical image registered in the image DB 6 and transmits the searched for medical image to the interpretation WS 3 and to the medical care WS 4 that are request sources.

The report server 7 incorporates a software program for providing a function of a database management system to a general-purpose computer. In a case where the report server 7 receives a request to register the interpretation report from the interpretation WS 3, the report server 7 prepares the interpretation report in a format for a database and registers the interpretation report in the report DB 8.

In the report DB 8, an interpretation report created by the radiologist using the interpretation WS 3 is registered. The interpretation report may include information such as, for example, a medical image to be interpreted, an image ID for identifying the medical image, a radiologist ID for identifying the radiologist who performed the interpretation, a disease name, disease position information, and information for accessing a medical image.

Further, in a case where the report server 7 receives the viewing request for the interpretation report from the interpretation WS 3 and the medical care WS 4 through the network 10, the report server 7 searches for the interpretation report registered in the report DB 8, and transmits the searched for interpretation report to the interpretation WS 3 and to the medical care WS 4 that are request sources.

The analysis server 9 has a software program installed on a computer that provides a function of analyzing a medical image via CAD or the like and detecting an abnormal shadow such as a lesion. A medical image analysis process on the analysis server 9 is performed according to instructions from the medical care WS 4 or the interpretation WS 3. In a case where the analysis server 9 receives instructions for the medical image analysis process, the analysis server 9 acquires the medical image to be processed from the image server 5. Then, the analysis server 9 analyzes the acquired medical image and transmits the analysis result to the medical care WS 4 or the interpretation WS 3 that has given the instructions. Further, the analysis result is transmitted to the image server 5 and is registered in the image DB 6. Examples of the analysis results include region information indicating the position of the abnormal shadow in the medical image specified by the analysis, contour information indicating the position of the contour of the abnormal shadow, coordinate information indicating the center position of the abnormal shadow, size information indicating the size of the abnormal shadow, and text information indicating the property of the abnormal shadow.

The analysis process via CAD can be performed by using a learning model in which machine learning is performed to detect an abnormal shadow from a medical image. The learning model consists of a convolutional neural network (CNN) in which deep learning has been performed using supervised training data so as to discriminate whether or not each pixel (voxel) in a medical image represents an abnormal shadow.

The learning model is constructed by training CNN using, for example, a large amount of supervised training data consisting of supervised training images that include abnormal shadows, a region of the abnormal shadows in the supervised training image, and correct answer data representing the properties of the abnormal shadows, and a large amount of supervised training data consisting of supervised training images that do not include abnormal shadows. The learning model derives the confidence degree (likelihood) indicating that each pixel in the medical image is an abnormal shadow, detects a region consisting of pixels whose confidence degree is equal to or higher than a predetermined threshold value as a region of the abnormal shadows, and derives the properties of the detected abnormal shadows. Here, the confidence degree is a value of 0 or more and 1 or less.

Further, as the learning model, any learning model such as, for example, a support vector machine (SVM) can be used in addition to the convolutional neural network.

In the present embodiment, it is assumed that the medical image is a radiation image acquired by a simple X-ray imaging apparatus whose diagnosis target is the lung, and the analysis server 9 detects the abnormal shadow included in the lung via CAD and derives the property of the abnormal shadow. The image is not limited to a radiation image, and may be a CT image or an MIll image consisting of a plurality of tomographic images.

The network 10 is a wired or wireless local area network that connects various apparatuses in a hospital to each other. In a case where the interpretation WS 3 is installed in another hospital or clinic, the network 10 may be configured to connect local area networks of respective hospitals through the Internet or a dedicated line.

Figure 2:
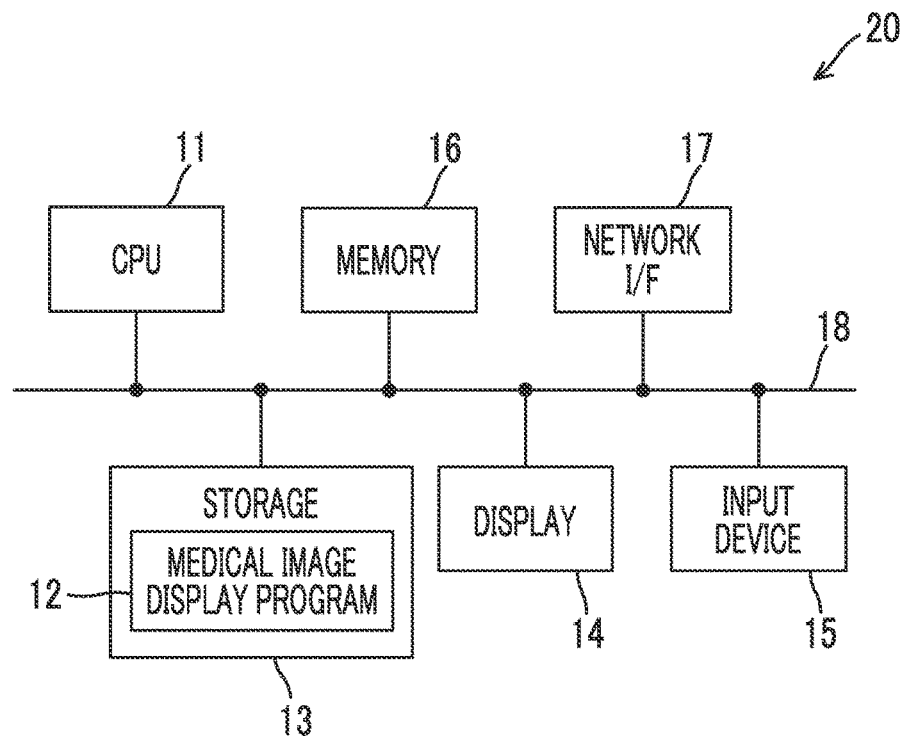
FIG. 2 is a diagram showing a schematic configuration of the medical image display apparatus according to the present embodiment.

Next, the medical image display apparatus according to the present embodiment will be described. FIG. 2 illustrates a hardware configuration of the medical image display apparatus according to the present embodiment. As shown in FIG. 2, the medical image display apparatus 20 includes a central processing unit (CPU) 11, a non-volatile storage 13, and a memory 16 as a temporary storage area. Further, the medical image display apparatus 20 includes a display 14 such as a liquid crystal display, an input device 15 consisting of a pointing device such as a keyboard and a mouse, and a network interface (I/F) 17 connected to the network 10. The CPU 11, the storage 13, the display 14, the input device 15, the memory 16, and the network I/F 17 are connected to a bus 18. The CPU 11 is an example of a processor in the present disclosure.

The storage 13 is realized by a hard disk drive (HDD), a solid state drive (SSD), a flash memory, and the like. A medical image display program 12 is stored in the storage 13 as the storage medium. The CPU 11 reads out the medical image display program 12 from the storage 13, loads the read-out program into the memory 16, and executes the loaded medical image display program 12.

Here, in the present embodiment, at the time of creating the interpretation report in the interpretation WS 3, the radiologist gives an analysis instruction of the medical image to the analysis server 9. Then, the radiologist displays the medical image on the display 14 and interprets the medical image with his/her own eyes. After that, the radiologist acquires the analysis result of the medical image from the analysis server 9, displays an annotation representing the analysis result on the medical image, and performs a second interpretation with reference to the displayed annotation representing the analysis result. The first interpretation is referred to as a primary interpretation, and the second interpretation with reference to the analysis result after the analysis result is displayed is referred to as a secondary interpretation.

Figure 3:
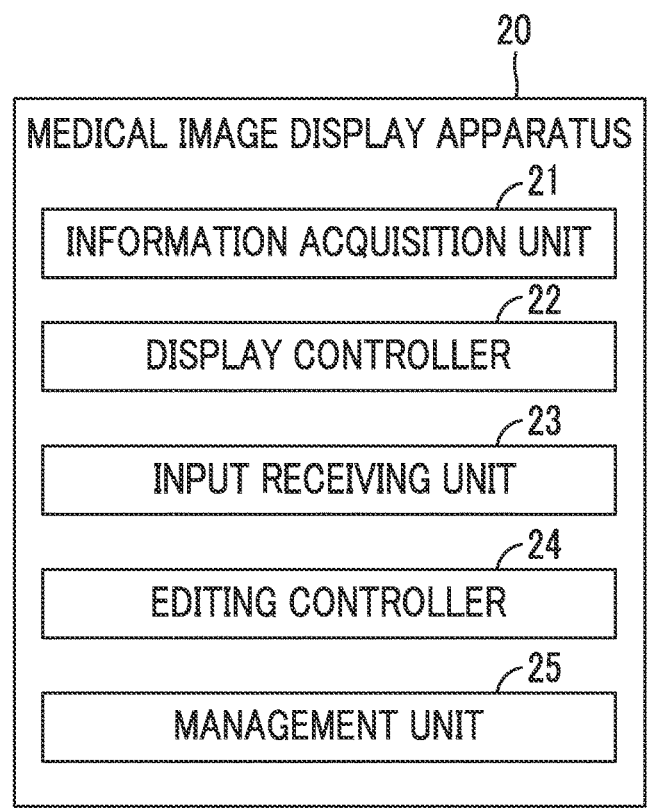
FIG. 3 is a functional configuration diagram of the medical image display apparatus according to the present embodiment.

Next, a functional configuration of the medical image display apparatus according to the present embodiment will be described. FIG. 3 is a diagram showing a functional configuration of the medical image display apparatus according to the present embodiment. As shown in FIG. 3, the medical image display apparatus 20 comprises an information acquisition unit 21, a display controller 22, an input receiving unit 23, an editing controller 24, and a management unit 25. Then, in a case where the CPU 11 executes the medical image display program 12, the CPU 11 functions as the information acquisition unit 21, the display controller 22, the input receiving unit 23, the editing controller 24, and the management unit 25.

The information acquisition unit 21 acquires a medical image G0 to be processed for creating an interpretation report from the image server 5 according to an instruction from the input device 15 by the radiologist who is an operator. In addition, according to the instruction from the input device 15, an instruction to analyze the medical image G0 to be processed is given to the analysis server 9, and the analysis result from the analysis server 9 is acquired.

The display controller 22 controls various displays including the display of the medical image G0 and the display of annotations representing each of the interpretation result and the analysis result to be described later. Further, as will be described later, the display of the analysis result is controlled according to reference information.

As will be described later, the editing controller 24 prohibits editing of a primary interpretation result input by the radiologist by the primary interpretation before displaying the annotation representing the analysis result after the annotation representing the analysis result is displayed. In addition, in a case where the annotation representing the analysis result is displayed, there is given a notification indicating that the editing of the primary interpretation result is prohibited. Further, the editing controller 24 saves an annotation representing the primary interpretation result and an annotation representing the secondary interpretation result input by the radiologist by the secondary interpretation after the annotation representing the analysis result is displayed in association with the medical image G0.

The management unit 25 associates the medical image with reference information indicating whether or not the analysis result for the medical image has been referenced by the user. Further, the management unit 25 associates reference information in a unit of a user.

Figure 4:
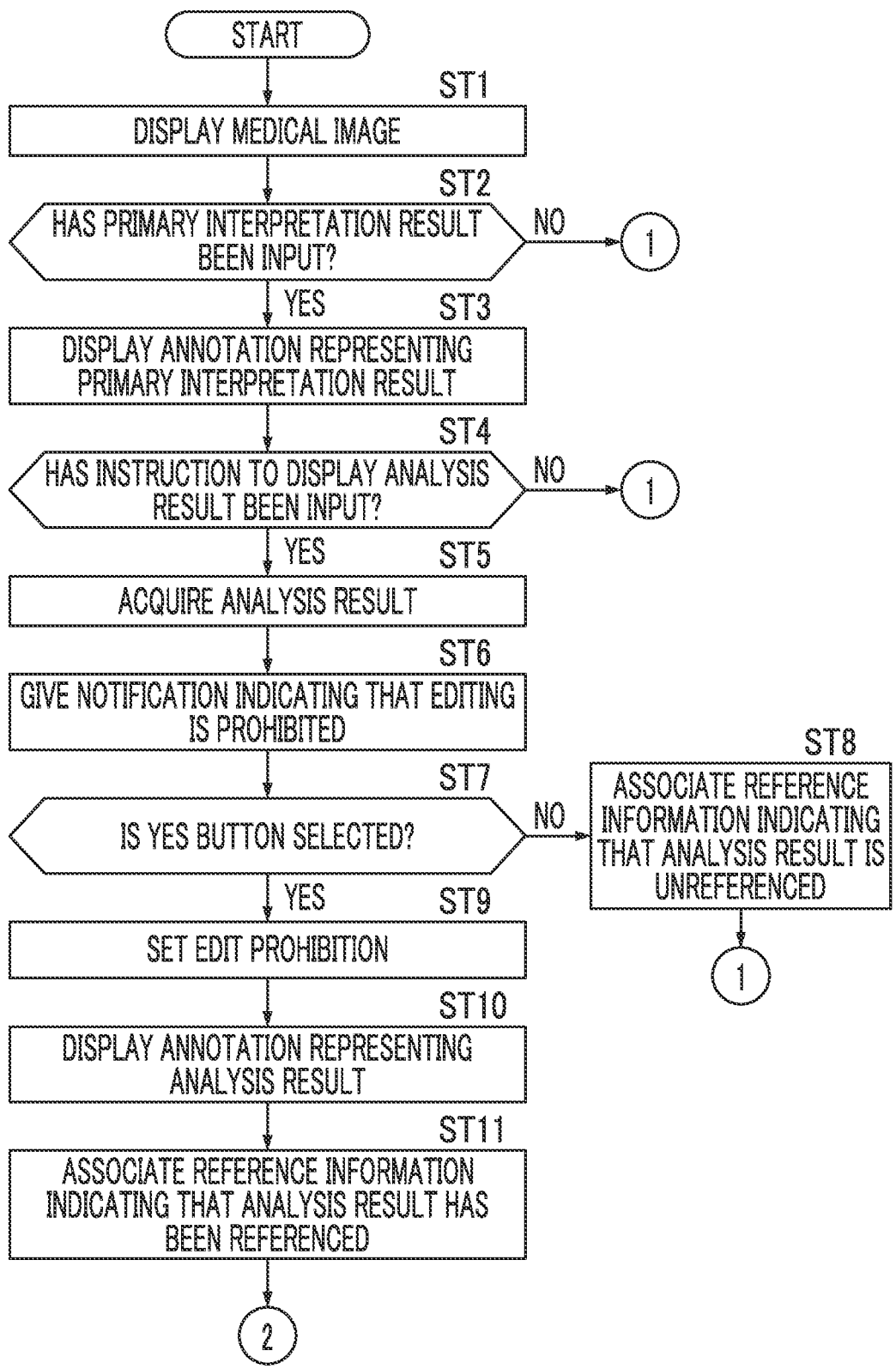
FIG. 4 is a flowchart showing a process performed in the present embodiment.
Figure 5:
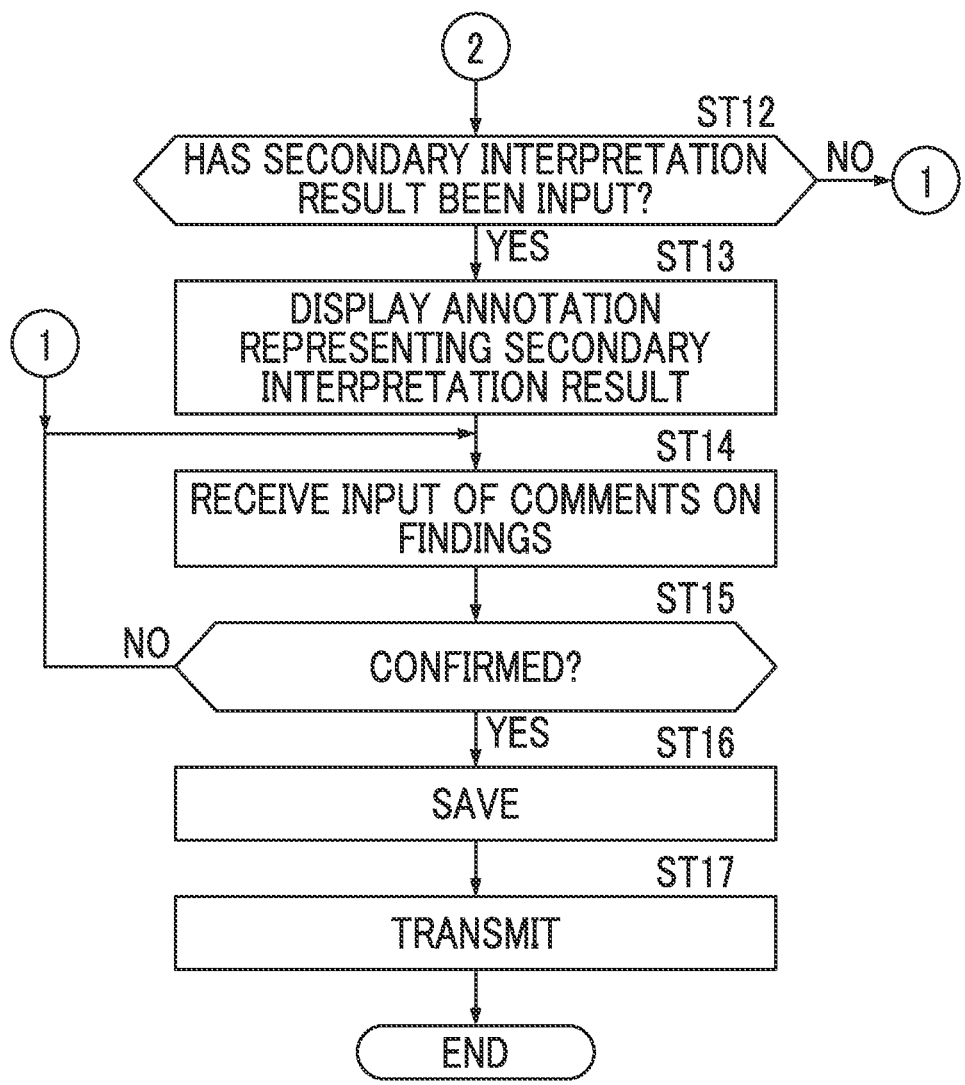
FIG. 5 is a flowchart showing a process performed in the present embodiment.

Hereinafter, a process performed in the present embodiment will be described in detail. FIGS. 4 and 5 are flowcharts showing a process performed in the present embodiment. Note that, it is assumed that the acquisition of the medical image G0 to be diagnosed and the instruction for analysis to the analysis server 9 have been completed. Further, in the flowcharts shown in FIGS. 4 and 5, it is assumed that the process using the reference information to be described later is not performed. The process is started in a case where an instruction to display the medical image G0 is given in order to create an interpretation report, and the display controller 22 displays the medical image G0 on the display 14 (Step ST1). Thereby, the radiologist performs the primary interpretation of the displayed medical image G0.

Figure 6:
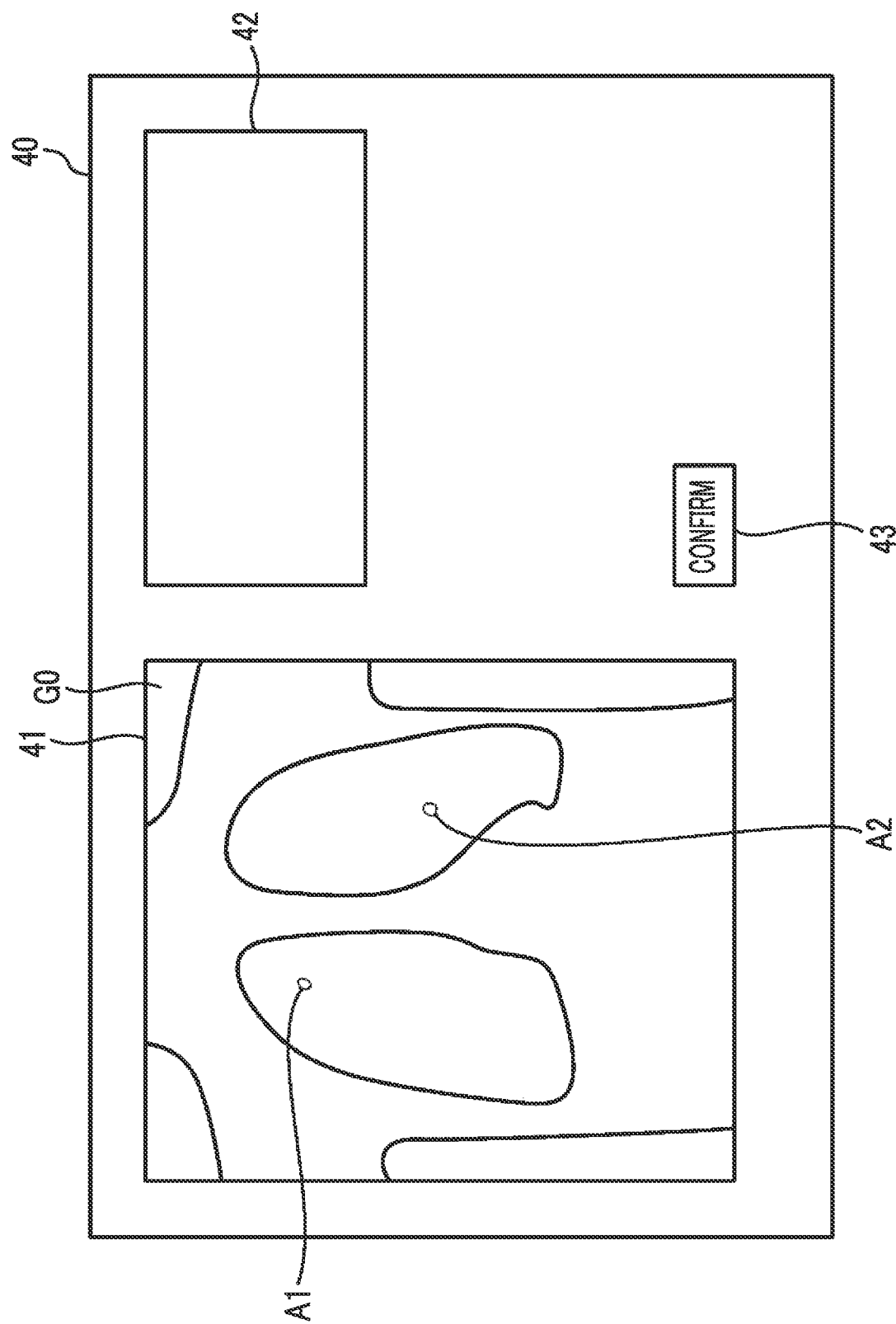
FIG. 6 is a diagram showing a display screen for primary interpretation.

FIG. 6 is a diagram showing a display screen for primary interpretation. As shown in FIG. 6, an image display region 41 and a sentence display region 42 are displayed on a display screen 40. Further, a confirmation button 43 for confirming the input content is also displayed. The medical image G0 is displayed in the image display region 41. As shown in FIG. 6, the medical image G0 is a radiation image of a chest of a human body. The medical image G0 includes two abnormal shadows A1 and A2. Further, in the sentence display region 42, comments on findings input by a radiologist are displayed.

Next, the input receiving unit 23 determines whether or not the primary interpretation result of the medical image G0 has been input by the radiologist (Step ST2), and in a case where Step ST2 is affirmative, the display controller 22 displays an annotation representing the primary interpretation result on the medical image G0 (Step ST3). In a case where Step ST2 is negative, the process proceeds to Step ST14.

Figure 7:
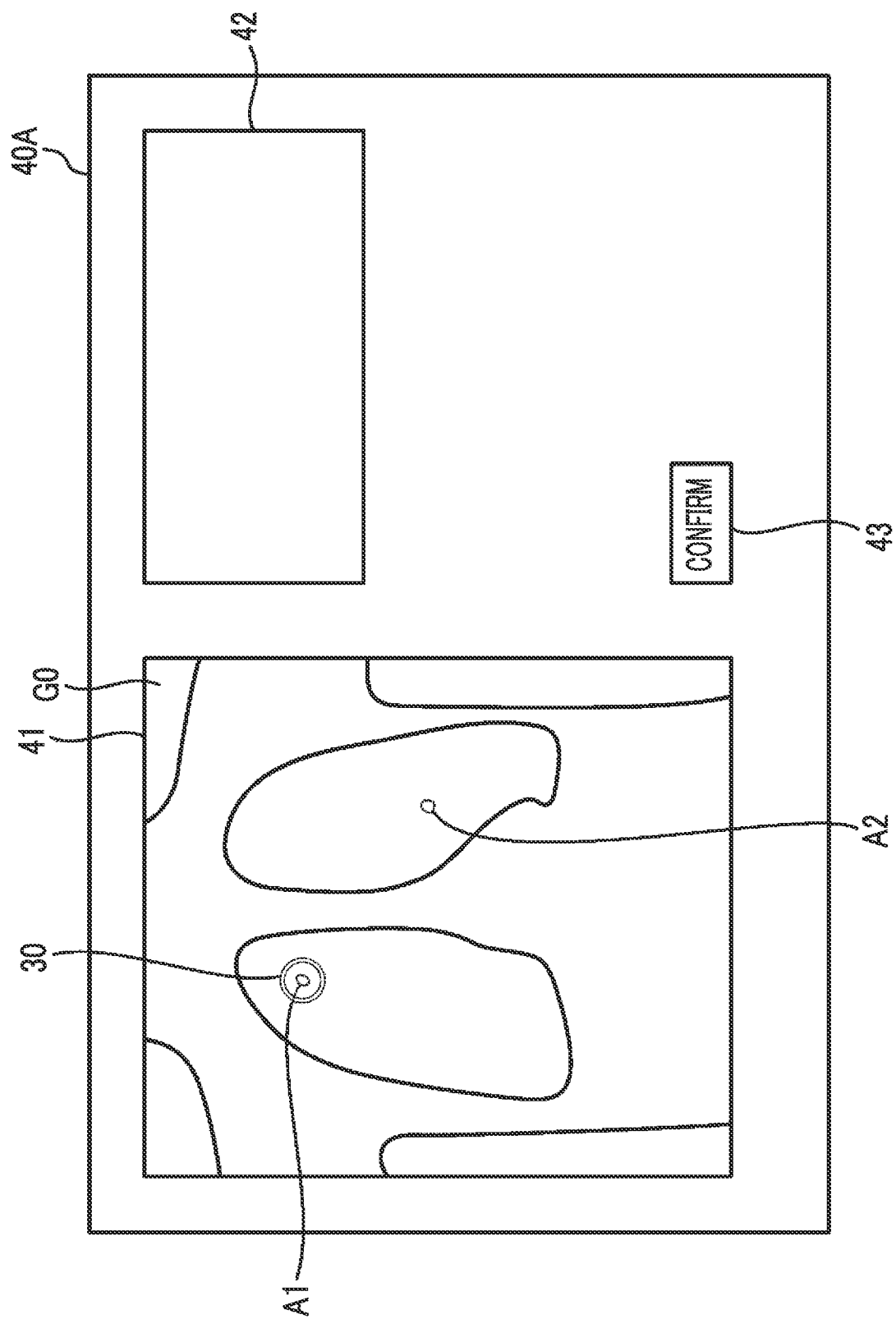
FIG. 7 is a diagram showing a display screen in which a primary interpretation result is displayed.

FIG. 7 is a diagram showing a display screen in which an annotation representing a primary interpretation result is displayed. As shown in FIG. 7, on the medical image G0 on a display screen 40A, a circular mark 30 is given to the abnormal shadow A1 specified by the radiologist by interpreting the medical image G0 as an annotation representing the primary interpretation result. Although only one mark 30 is displayed in FIG. 7, in a case where a plurality of abnormal shadows are found as a result of interpretation, a mark is given to each of them. The mark is not limited to a circle, but may have a polygonal shape, or may have any shape such as an arrow. Further, the annotation representing the primary interpretation result is not limited to the mark, and may be text in which the content of the doctor's interpretation result is described. In the case of text, the display region of the text is displayed as an annotation adjacent to the abnormal shadow. Further, here, for the sake of description, it is assumed that the abnormal shadow A2 is not specified in the primary interpretation.

Next, the input receiving unit 23 determines whether or not the instruction to display the analysis result has been input (Step ST4), and in a case where Step ST4 is affirmative, the information acquisition unit 21 acquires the analysis result of the medical image G0 (Step ST5). The analysis result may be acquired while the processes of Steps ST1 to ST4 are being performed, or may be acquired before the process of Step ST1. On the other hand, in a case where Step ST4 is negative, the process proceeds to Step ST14.

Figure 8:
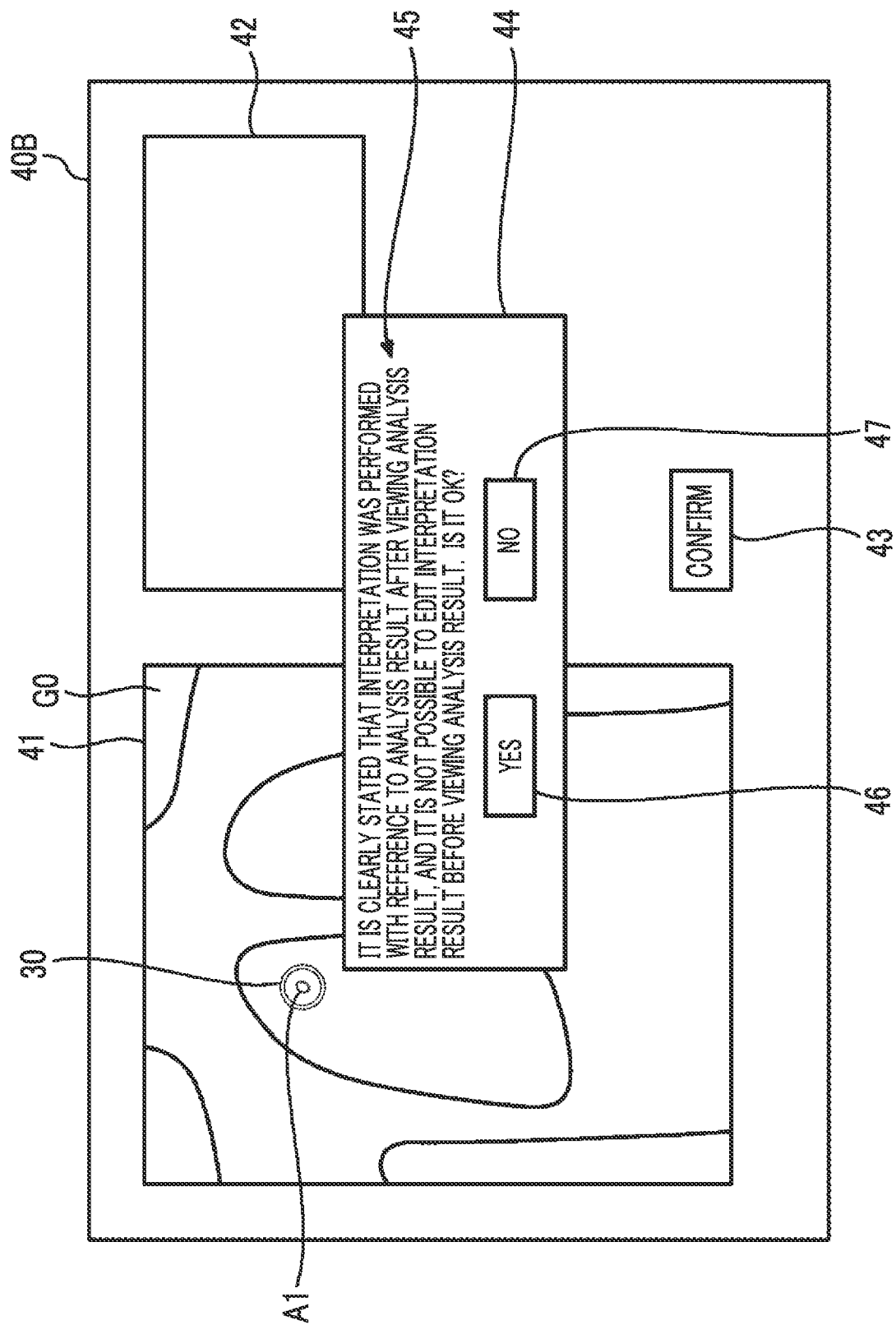
FIG. 8 is a diagram showing a display screen in which an edit prohibition notification is displayed.

Subsequently, the editing controller 24 gives a notification indicating that editing of the primary interpretation result input by the radiologist is prohibited (Step ST6). FIG. 8 is a diagram showing a display screen in which an edit prohibition notification is displayed. As shown in FIG. 8, an edit prohibition notification 44 is displayed on to display screen 40B. In the edit prohibition notification 44, text 45 "After viewing the analysis result, it is clearly stated that the interpretation was performed with reference to the analysis result, and it is not possible to edit the interpretation result before viewing the analysis result. Is it OK?", a YES button 46, and a NO button 47 are displayed. In a case where the NO button 47 is selected (Step ST7; NO), the analysis result is not displayed and is not referred to by the radiologist who is the user. Therefore, the management unit 25 associates reference information indicating that the analysis result is unreferenced with the medical image G0 (association of the reference information indicating that the analysis result is unreferenced; Step ST8), and proceeds to the process of Step ST14 to be described later. The reference information is included in the management information to be described later.

In a case where the YES button 46 is selected (Step ST7; YES), the editing controller 24 sets the editing of the primary interpretation result to be prohibited (Step ST9). Specifically, an edit prohibition flag is set for information indicating the primary interpretation result so that the mark 30 which is the primary interpretation result cannot be deleted from the medical image G0, the mark 30 cannot be changed, the position of the mark 30 cannot be changed, and the like. Then, the analysis result acquired by the display controller 22 is displayed on the medical image G0 (Step ST10). Further, the management unit 25 associates reference information indicating that the analysis result has been referred to by the radiologist with the medical image G0 (association of the reference information indicating that the analysis result has been referenced; Step ST11). The process of Step ST11 may be performed before the process of Step ST10, or may be performed in parallel with the process of Step ST10.

Figure 9:
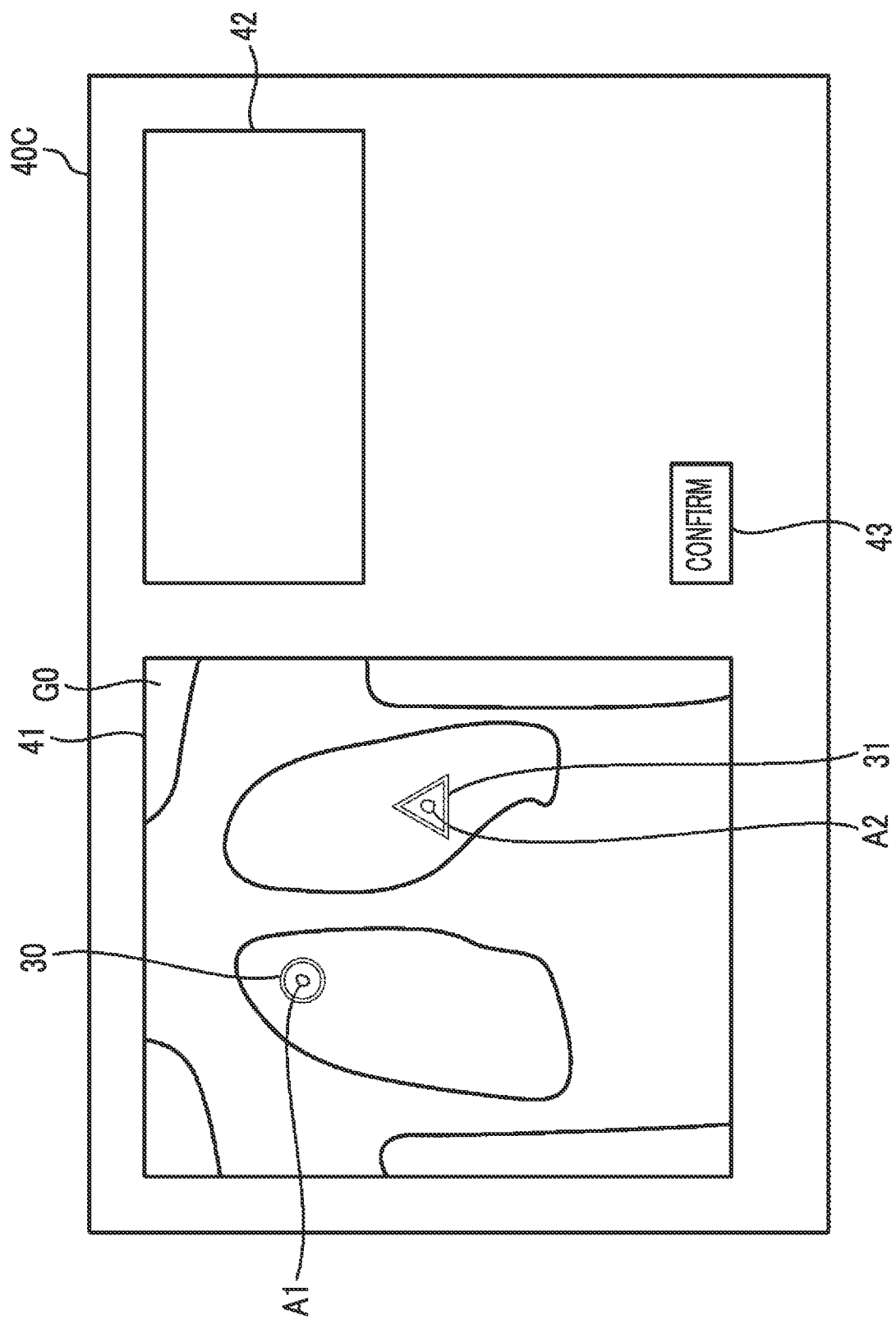
FIG. 9 is a diagram showing a display screen in which an analysis result is displayed.

FIG. 9 is a diagram showing a display screen on which an annotation representing an analysis result is displayed. As shown in FIG. 9, on the medical image G0 displayed on a display screen 40C, in addition to the circular mark 30 which is an annotation representing the primary interpretation result, a triangular mark 31 which is an annotation representing the analysis result is displayed.

Here, since the annotation representing the primary interpretation result is the circular mark 30 and the annotation representing the analysis result is the triangular mark 31, the annotation representing the primary interpretation result and the annotation representing the analysis result are displayed in a distinguishable manner. The mark 30 and the mark 31 may have different colors in addition to or instead of having different shapes, or may have different line types. After this, the radiologist refers to the analysis result and performs further interpretation of the medical image G0, that is, secondary interpretation.

As an annotation representing the analysis result, text indicating the property included in the analysis result may be displayed. In this case, a text box is associated with the abnormal shadow detected by the analysis result, and the property is described in the text box.

Figure 10:
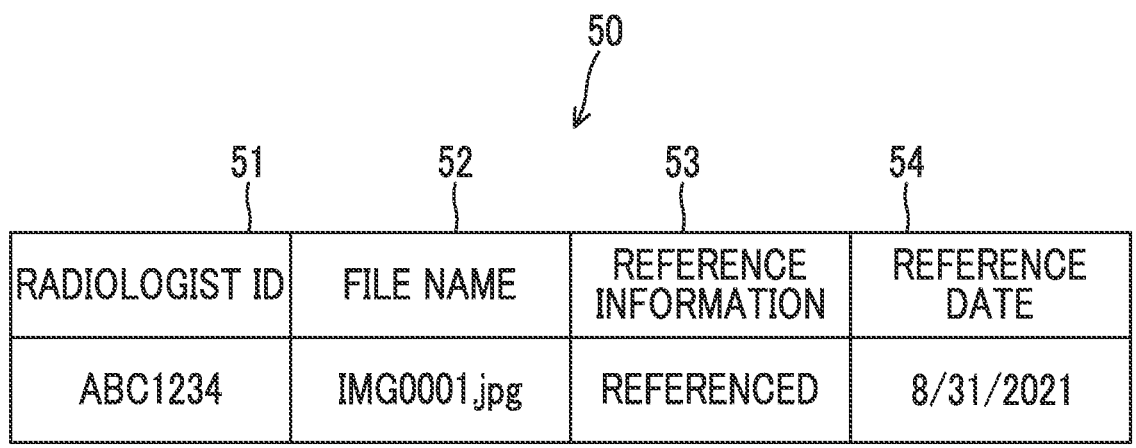
FIG. 10 is a diagram showing management information including reference information associated with a medical image.

FIG. 10 is a diagram showing management information including reference information associated with a medical image. As shown in FIG. 10, the management information 50 includes a radiologist ID 51 that specifies a radiologist who is interpreting the medical image G0, a file name 52 of the medical image G0, reference information 53 indicating whether or not the analysis result has been referenced, and a reference date 54 in the case of "referenced". In a case where the analysis result is "unreferenced", the information on the reference date 54 will be blank. Further, the management information 50 is saved in the storage 13.

Next, the input receiving unit 23 determines whether or not the secondary interpretation result of the medical image G0 has been input by the radiologist with reference to the analysis result (Step ST12), and in a case where Step ST12 is affirmative, the display controller 22 displays an annotation representing the secondary interpretation result on the medical image G0 (Step ST13). In a case where Step ST12 is negative, the process proceeds to Step ST14.

Figure 11:
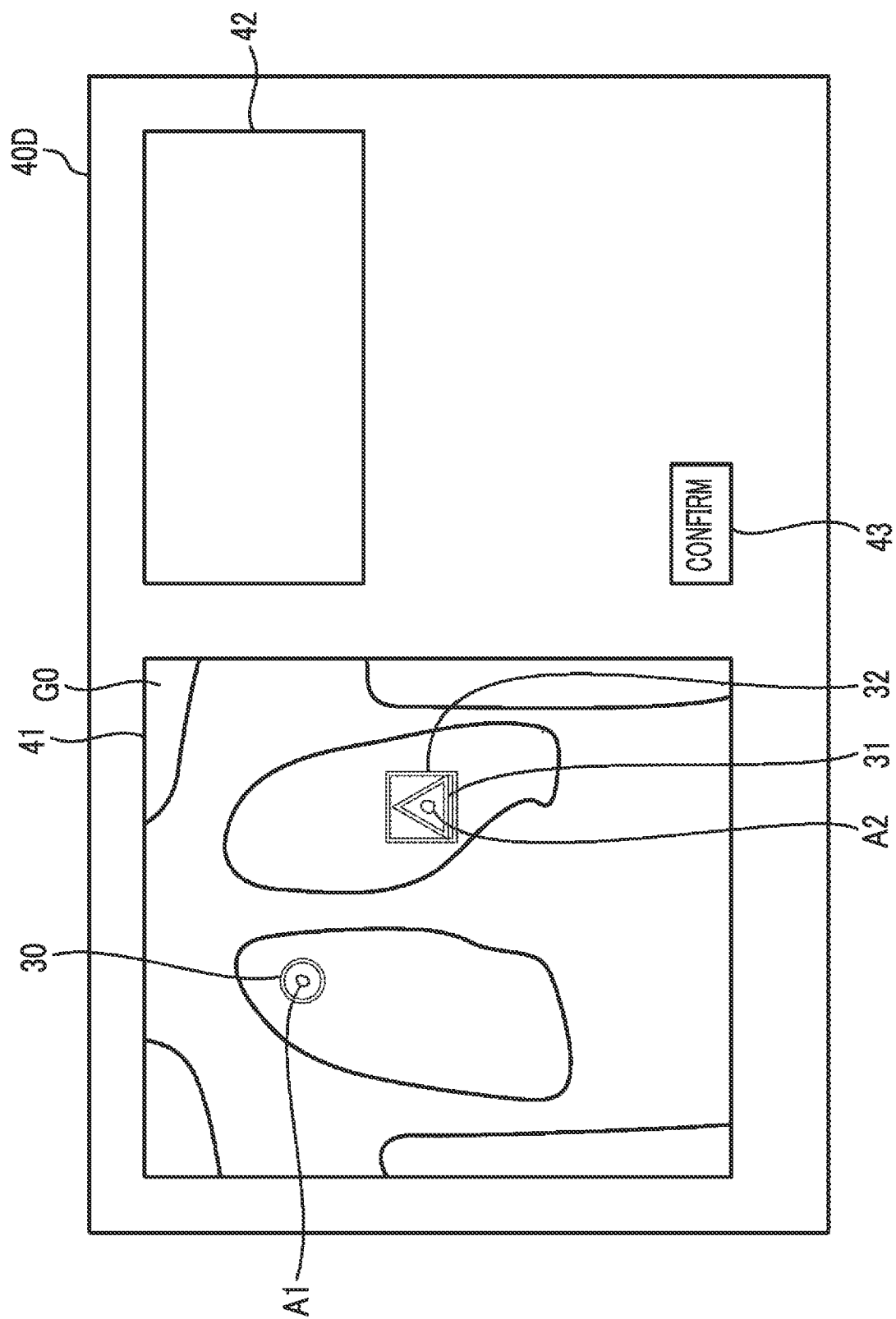
FIG. 11 is a diagram showing a display screen in which a secondary interpretation result is displayed.

FIG. 11 is a diagram showing a display screen in which an annotation representing a secondary interpretation result is displayed. As shown in FIG. 11, on the medical image G0 of a display screen 40D, in addition to the circular mark 30 which is an annotation representing the primary interpretation result and the triangular mark 31 which is an annotation representing the analysis result, a rectangular mark 32 which is an annotation representing the secondary interpretation result is displayed. Since the rectangular mark 32 is given to the abnormal shadow A2 specified by the analysis result, the triangular mark 31 and the rectangular mark 32 are displayed to overlap each other.

Here, since the annotation representing the primary interpretation result is the circular mark 30 and the annotation representing the secondary interpretation result is the rectangular mark 32, the annotation representing the primary interpretation result and the annotation representing the secondary interpretation result are displayed in a distinguishable manner. The mark 30 and the mark 32 may have different colors in addition to or instead of having different shapes, or may have different line types.

Subsequently, the editing controller 24 receives the input of the comments on findings by the radiologist to the sentence display region 42 (Step ST14). Then, the editing controller 24 determines whether or not the confirmation button 43 has been selected (Step ST15), and returns to Step ST14 in a case where Step ST15 is negative. In a case where Step ST15 is affirmative, the editing controller 24 saves the annotation representing the primary interpretation result and the annotation representing the secondary interpretation result in the medical image G0 in the storage 13 in association with the medical image G0 (Step ST16). In a case where the process of Step ST2 is negative, the annotation representing the interpretation result is not associated with the medical image G0. In a case where the processes of Steps ST4, ST7, and ST12 are negative, only the annotation representing the primary interpretation result is saved in association with the medical image G0.

Further, the editing controller 24 generates an interpretation report in which the comments on findings are described and transmits it to the report server 7, further transmits the medical image G0 and the management information including the reference information saved in the storage 13 to the image server 5 (Step ST17), and ends the process.

Here, saving the annotation representing the primary interpretation result and the annotation representing the secondary interpretation result in association with the medical image G0 means that the annotation representing the primary interpretation result and the annotation representing the secondary interpretation result are saved to be integrally inseparable from the medical image G0. Specifically, a mode such as superimposing on the medical image G0 or writing in tag information of the medical image G0 can be employed. Thereby, when the medical image G0 is displayed later, by displaying the medical image G0 together with the annotation saved in association with the medical image G0, the annotation representing the primary interpretation result and the annotation representing the secondary interpretation result can be displayed in the same manner as the display screen 40C shown in FIG. 9 and the display screen 40D shown in FIG. 11.

Figures 12, 13:
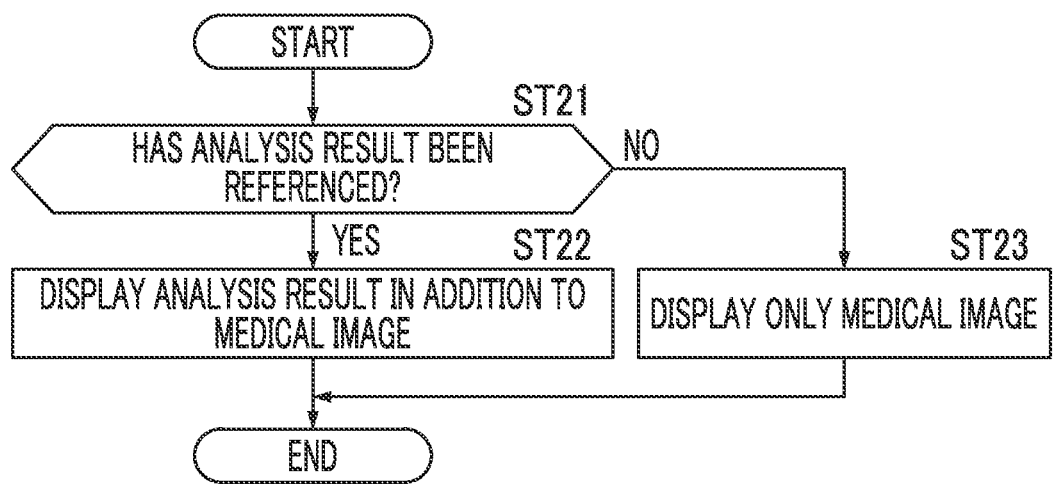
FIG. 12 is a diagram showing another example of reference information associated with a medical image.
FIG. 13 is a flowchart showing a process performed using the reference information in the present embodiment.

On the other hand, in the image server 5, the management information 50 including the reference information associated with the medical image G0 is saved. Here, in a case where a plurality of radiologists interpret the same medical image G0, in the image server 5, the reference information is managed for each medical image in a unit of a radiologist. For example, in management information 50A shown in FIG. 12, in a case where two radiologists perform interpretation on the medical image G0 with a file name IMG0001.jpg, reference information is managed for each radiologist. In FIG. 12, the reference information 53 has been referenced by a radiologist whose radiologist ID is ABC1234, and the reference information 53 is unreferenced by a radiologist whose radiologist ID is DEF6789.

Next, a process using the reference information in the present embodiment will be described. FIG. 13 is a flowchart showing a process performed using the reference information in the present embodiment. It is assumed that the acquisition of the medical image G0 to be diagnosed from the image server 5 and the management information including the reference information and the acquisition of the analysis result from the analysis server 9 have been completed. The process is started in a case where an instruction to display the medical image G0 is given in order to create an interpretation report, and the management unit 25 determines whether or not the analysis result for the medical image G0 has been referenced based on the reference information associated with the medical image G0 with respect to the radiologist who is trying to perform the interpretation (Step ST21).

In a case where Step ST21 is affirmative, the display controller 22 displays the analysis result in addition to the medical image G0 without receiving an instruction to display the analysis result (Step ST22), and ends the process. On the other hand, in a case where Step ST22 is negative, the display controller 22 displays only the medical image G0 (Step ST23) and ends the process.

Figure 14:
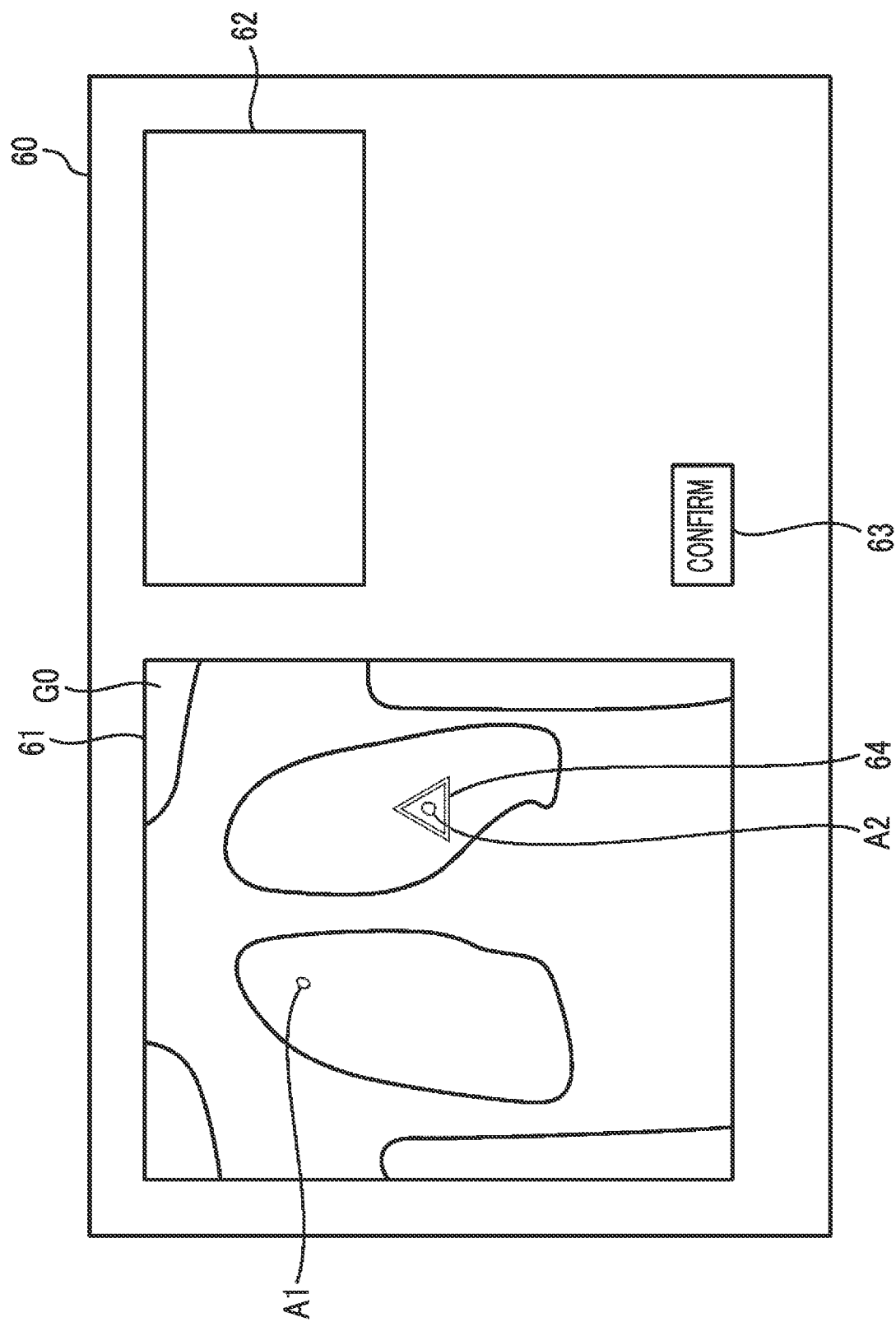
FIG. 14 is a diagram showing a display screen in which an analysis result is displayed.

FIG. 14 is a diagram showing a display screen in which an analysis result is displayed. As shown in FIG. 14, an image display region 61, a sentence display region 62, and a confirmation button 63 are displayed on a display screen 60. The medical image G0 is displayed in the image display region 61. A mark 64, which is an annotation representing the analysis result, is displayed on the medical image G0. In this case, the radiologist interprets the medical image G0 once. Therefore, in a case where the primary interpretation result is associated with the medical image G0, the annotation representing the primary interpretation result may be displayed in addition to the annotation representing the analysis result. In this case, if necessary, the radiologist performs the interpretation while referring to the analysis result, and if necessary, creates an interpretation report.

On the other hand, in a case where Step ST22 is negative and only the medical image G0 is displayed, the display controller 22 displays the display screen 40 shown in FIG. 6. The radiologist may create an interpretation report by the same process as the flowcharts shown in FIGS. 4 and 5 above.

In this way, in the present embodiment, based on the reference information indicating whether or not the analysis result has been referenced by the radiologist who is the user, in a case where the analysis result has been referenced and an instruction to display the medical image G0 is given, an annotation representing the analysis result for the instructed medical image G0 is displayed in addition to the instructed medical image G0. Therefore, in a case where the analysis result has been referenced, and next, the medical image G0 is displayed, the annotation representing the analysis result is displayed in addition to the medical image G0 without receiving the instruction to display the analysis result by the radiologist. Therefore, according to the present embodiment, it is possible to display the analysis result for the medical image without performing the work of receiving the display instruction every time the analysis result is displayed or displaying the medical image for a prescribed time or longer.

Further, in the present embodiment, the annotation representing the primary interpretation result before displaying the analysis result and the annotation representing the secondary interpretation result after displaying the annotation representing the analysis result are displayed in a distinguishable manner. Therefore, in the displayed medical image G0, it is possible to ascertain how the analysis result of the medical image via CAD affected the interpretation result of the doctor.

Further, by prohibiting the editing of the primary interpretation result after displaying the annotation representing the analysis result, it is possible to prevent the primary interpretation result from being modified by the radiologist before the annotation representing the analysis result is displayed. Therefore, it is possible to more accurately ascertain how the analysis result of the medical image via CAD affected the interpretation result of the doctor.

In addition, by giving a notification indicating that the editing of the primary interpretation result is prohibited before the annotation representing the analysis result is displayed, the radiologist can know in advance that the editing of the primary interpretation result is prohibited. Therefore, it is possible to be more careful in displaying the analysis result, and as a result, it is possible to encourage the radiologist to perform the interpretation before displaying the analysis result more carefully.

Further, by saving the annotation representing the primary interpretation result and the annotation representing the secondary interpretation result in association with the medical image G0, in a case where the medical image G0 is displayed later, it is possible to ascertain how the analysis result of the medical image via CAD affected the interpretation result of the doctor.

Figures 15, 16:
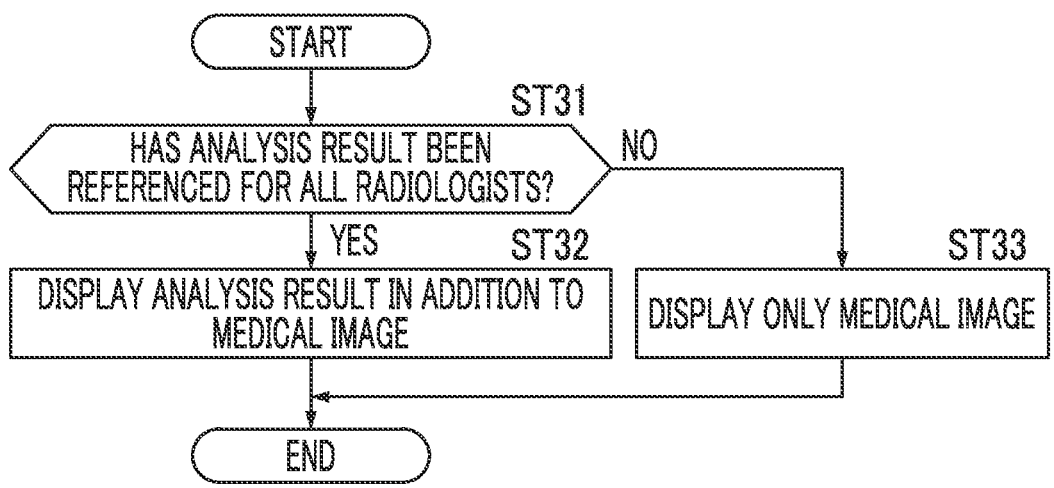
FIG. 15 is a diagram showing another example of management information including reference information.
FIG. 16 is a flowchart showing a process performed using reference information managed in a unit of a group.

In the above embodiment, the reference information is managed in a unit of a user in the management information, but the present disclosure is not limited thereto. For example, a medical image of a patient managed by a plurality of doctors is interpreted by the plurality of doctors. Therefore, the reference information may be managed in a unit of a group including a plurality of doctors. FIG. 15 is a diagram showing management information including reference information managed in a unit of a group. In management information 50B shown in FIG. 15, a group 55 consisting of four doctors is set for the medical image G0 with a file name IMG0002.jpg. Further, in the management information 50B, the reference information 53 of the analysis result and the reference date 54 in a case where the analysis result has been referenced are set for each doctor included in the group 55.

Next, a process using reference information managed in a unit of a group will be described. FIG. 16 is a flowchart showing a process performed using reference information managed in a unit of a group. It is assumed that the acquisition of the medical image G0 to be diagnosed from the image server 5 and the management information including the reference information and the acquisition of the analysis result from the analysis server 9 have been completed. The process is started in a case where an instruction to display the medical image G0 is given in order to create an interpretation report, and the management unit 25 determines whether or not the analysis result has been referenced based on the reference information associated with the medical image G0 for all radiologists included in a group to which a radiologist who is trying to perform the interpretation belongs (Step ST31).

In a case where Step ST31 is affirmative, the display controller 22 displays the analysis result in addition to the medical image G0 without receiving an instruction to display the analysis result (Step ST32), and ends the process. On the other hand, in a case where Step ST31 is negative because the analysis result is unreferenced for at least one radiologist included in the group, the display controller 22 displays only the medical image G0 even though the radiologist who is trying to perform the interpretation has referenced the analysis result for the medical image G0 (Step ST33), and ends the process.

In addition, at the time of managing the reference information in a unit of a group, as a result of performing the interpretation with reference to the analysis result by a certain radiologist, there is a case where the medical image G0 is desired to be interpreted by a plurality of doctors. In such a case, a group including a plurality of doctors is created, and the medical image G0 is registered in the group. At the time of registration, the reference information associated with the medical image G0 may be changed to "unreferenced" for the radiologist who has referenced the analysis result included in the group.

Figure 17:
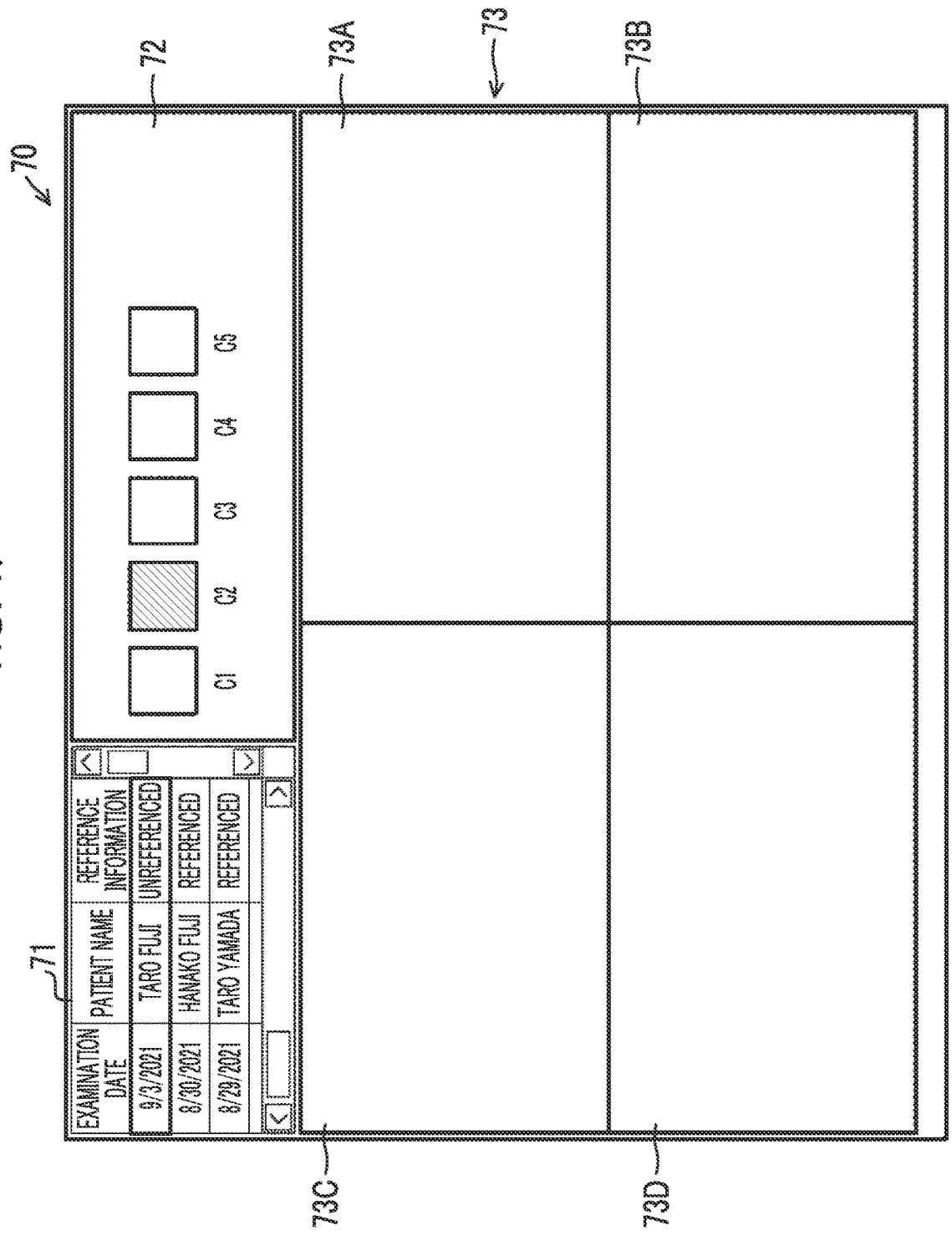
FIG. 17 is a diagram showing a display screen in which whether or not the analysis result has been referenced is displayed in a visually recognizable manner.

Further, in the above embodiment, at the time of displaying the medical image G0, it may be displayed whether or not the analysis result has been referenced in a visually recognizable manner. FIG. 17 is a diagram showing a display screen in which whether or not the analysis result has been referenced is displayed in a visually recognizable manner. As shown in FIG. 17, a display screen 70 includes an examination list region 71, a thumbnail region 72, and an image display region 73.

In the examination list region 71, the examination date, the patient name, and the reference information are displayed for each examination. The radiologist can select the patient to be examined by clicking on the desired examination. In FIG. 17, the line of the examination in which the patient name selected in the examination list region 71 is "Taro Fuji" is surrounded by a thick line. Further, in the examination displayed in the examination list region 71, it is shown whether the analysis result has been referenced or is unreferenced in a visually recognizable manner. In FIG. 17, it can be seen that the analysis result of Taro Fuji is unreferenced, but the analysis results of Hanako Fuji and Taro Yamada have been referenced.

In the thumbnail region 72, a thumbnail image of a representative image of the medical image G0 of the selected patient to be examined is displayed. Here, it is assumed that a plurality of types of medical images such as CT images, MM images, and simple radiation images are acquired in one examination. Therefore, thumbnail images for each of the plurality of types of medical images are displayed in the thumbnail region 72. In addition, thumbnail images of past images of selected patients to be examined are also displayed in the thumbnail region 72 for comparative interpretation. In FIG. 17, it is assumed that thumbnail images C1 to C3 for three medical images G1 to G3 and thumbnail images C4 and C5 for two past images G4 and G5 are displayed. Here, in a case where the medical image is a three-dimensional image, a minified image of a tomographic image of a predetermined tomographic plane included in the three-dimensional image can be used as a representative image. In the case of a simple radiation image, the minified image can be used as a representative image. By selecting the thumbnail image displayed in the thumbnail region 72, the radiologist can display the medical image corresponding to the selected thumbnail image in the image display region 73.

Further, for the medical image G2, it is assumed that the analysis result has been acquired by the analysis server 9. Here, the patient to be examined currently selected is Taro Fuji, and the analysis result is unreferenced. Therefore, by painting black or graying out the thumbnail image C2 of the medical image G2 displayed in the thumbnail region 72, it is shown that the analysis result is unreferenced. In addition, in FIG. 17, it is shown that the thumbnail image C2 is painted black or grayed out by adding diagonal lines thereto.

The image selected in the thumbnail region 72 is displayed in the image display region 73. As shown in FIG. 17, the image display region 73 includes four display regions 73A to 73D. Therefore, a maximum of four medical images can be displayed in the image display region 73.

As shown in FIG. 17, in the case of displaying the medical image, by displaying whether or not the analysis result has been referenced in a visually recognizable manner, the radiologist can ascertain whether or not the analysis result has been referenced before displaying the medical image of the patient to be interpreted. Here, the analysis result affects the interpretation result of the radiologist. Therefore, by displaying whether or not the analysis result has been referenced in a visually recognizable manner, it is possible to prevent the analysis result of the unreferenced medical image G0 from being erroneously displayed.

Further, in the above embodiment, in a case where the analysis result has been referenced, a set value indicating whether or not to display the analysis result may be managed even though there is no instruction to display the analysis result in a case where the radiologist next displays the medical image G0. Hereinafter, this will be described as another embodiment.

Figure 18:
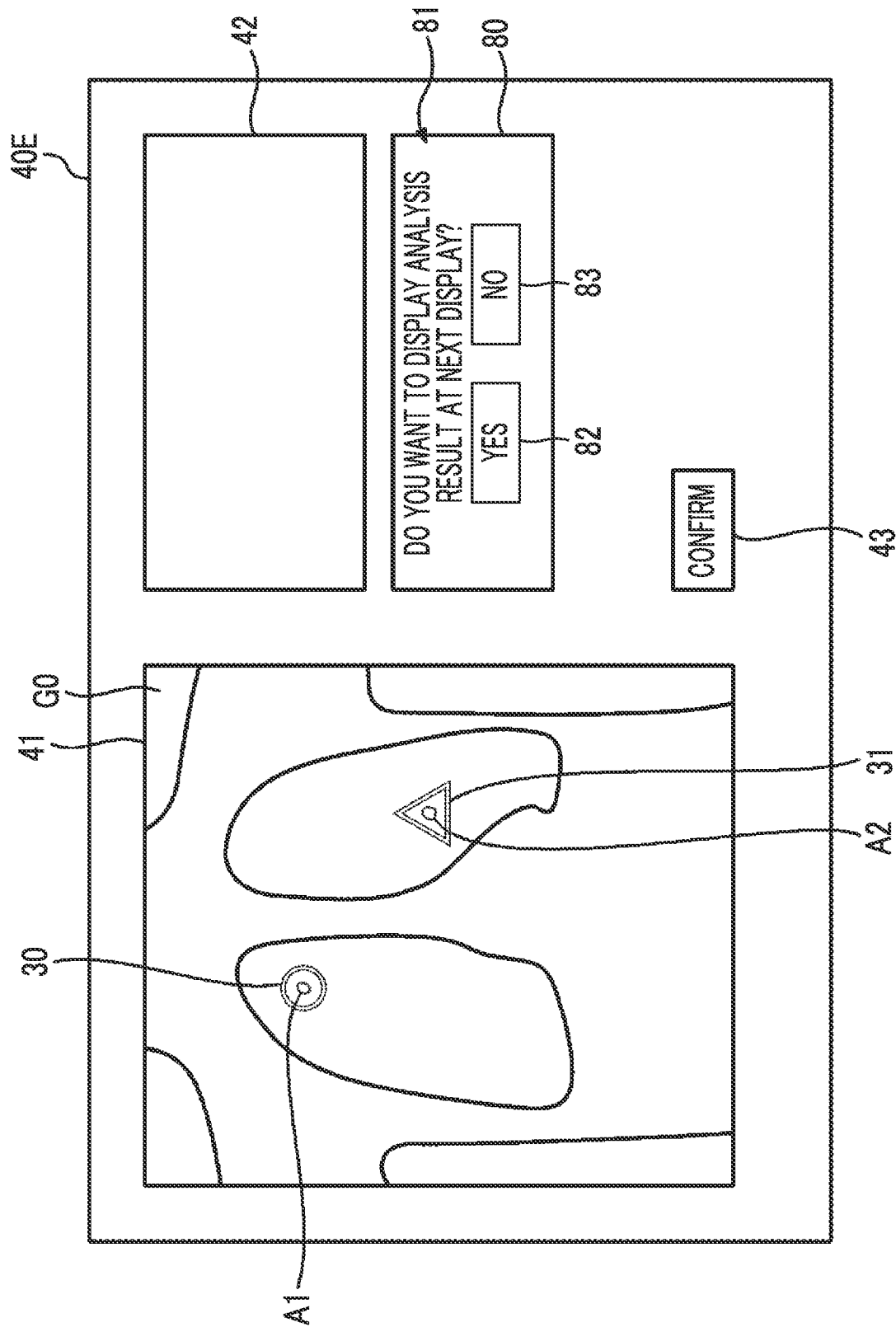
FIG. 18 is a diagram showing a display screen in which an analysis result in another embodiment is displayed.

FIG. 18 is a diagram showing a display screen on which an annotation representing an analysis result in another embodiment is displayed. In addition to the display screen 40C shown in FIG. 9, a setting region 80 is displayed on a display screen 40E shown in FIG. 18. In the setting region 80, text 81 of "Do you want to display the analysis result at the next display?", a YES button 82, and a NO button 83 are displayed.

In a case where the radiologist selects the YES button 82 in the setting region 80, regarding the medical image G0 being displayed, the management unit 25 sets the set value of whether or not to display the analysis result to "display" even though there is no instruction to display the analysis result in a case where the radiologist next displays the medical image G0. In a case where the radiologist selects the NO button 83, regarding the medical image G0 being displayed, the management unit 25 sets the set value of whether or not to display the analysis result to "hidden" even though there is no instruction to display the analysis result in a case where the radiologist next displays the medical image G0. The set value is managed together with the reference information.

Figures 19, 20:
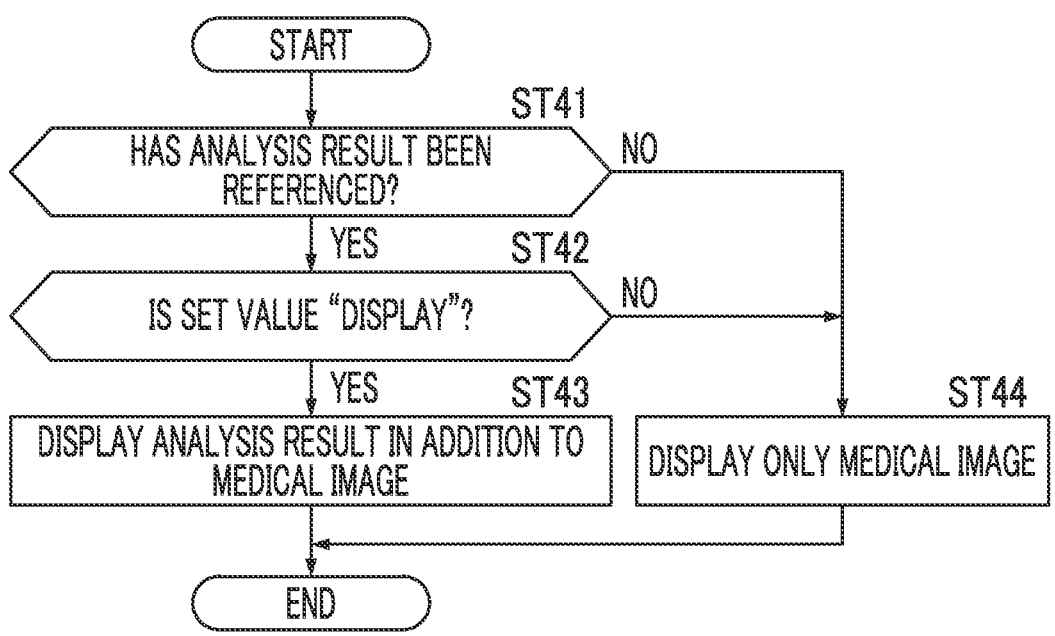
FIG. 19 is a diagram showing management information including reference information associated with a medical image in the other embodiment.
FIG. 20 is a flowchart showing a process performed using the reference information in the other embodiment.

FIG. 19 is a diagram showing management information including reference information associated with a medical image in the other embodiment. In addition to the management information 50 shown in FIG. 10, management information 50C shown in FIG. 19 includes a set value 56 of whether or not to display the analysis result even though there is no instruction to display the analysis result in a case where the radiologist next displays the medical image G0. The set value of the management information 50C shown in FIG. 19 is "hidden". Therefore, for the medical image G0, even though the analysis result has been referenced, the analysis result will not be displayed at the next display.

Next, a process using the reference information in the other embodiment will be described. FIG. 20 is a flowchart showing a process performed using the reference information in the other embodiment. It is assumed that the acquisition of the medical image G0 to be diagnosed from the image server 5 and the management information including the reference information and the acquisition of the analysis result from the analysis server 9 have been completed. The process is started in a case where an instruction to display the medical image G0 is given in order to create an interpretation report, and the management unit 25 determines whether or not the analysis result for the medical image G0 has been referenced based on the reference information associated with the medical image G0 with respect to the radiologist who is trying to perform the interpretation (Step ST41).

In a case where Step ST41 is affirmative, the display controller 22 determines whether or not the set value of whether or not to display the analysis result is "display" even though there is no instruction to display the analysis result in a case where the radiologist who is trying to perform the interpretation next displays the medical image G0 (Step ST42). In a case where Step ST42 is affirmative, the analysis result is displayed in addition to the medical image G0 without receiving an instruction to display the analysis result (Step ST43), and the process is ended. On the other hand, in a case where Step ST41 and Step ST 42 are negative, the display controller 22 displays only the medical image G0 (Step ST44) and ends the process.

In the above embodiment, the reference information is managed in association with the medical image, but the present disclosure is not limited thereto. The reference information may be managed in association with the analysis result.

Further, in the above embodiment, the analysis server 9 analyzes the medical image G0, but the present disclosure is not limited thereto. The interpretation WS 3 may analyze the medical image G0.

Further, in each of the above embodiments, the technique of the present disclosure is applied in the case of creating an interpretation report using a medical image with lung or liver as the diagnosis target, but the diagnosis target is not limited to lung or liver. In addition to the lung, any part of a human body such as a heart, brain, kidneys, and limbs can be diagnosed.

Further, in each of the above embodiments, for example, as hardware structures of processing units that execute various kinds of processing, such as the information acquisition unit 21, the display controller 22, the input receiving unit 23, the editing controller 24, and the management unit 25, various processors shown below can be used. As described above, the various processors include a programmable logic device (PLD) as a processor of which the circuit configuration can be changed after manufacture, such as a field programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (programs).

One processing unit may be configured by one of the various processors, or may be configured by a combination of the same or different kinds of two or more processors (for example, a combination of a plurality of FPGAs or a combination of the CPU and the FPGA). In addition, a plurality of processing units may be configured by one processor.

As an example where a plurality of processing units are configured by one processor, first, there is a form in which one processor is configured by a combination of one or more CPUs and software as typified by a computer, such as a client or a server, and this processor functions as a plurality of processing units. Second, there is a form in which a processor for realizing the function of the entire system including a plurality of processing units via one integrated circuit (IC) chip as typified by a system on chip (SoC) or the like is used. In this way, various processing units are configured by one or more of the above-described various processors as hardware structures.

Furthermore, as the hardware structure of the various processors, more specifically, an electrical circuit (circuitry) in which circuit elements such as semiconductor elements are combined can be used.

What is claimed is:

1. A medical image display apparatus comprising at least one processor,
   wherein the at least one processor is configured to:
   display a medical image, acquire an analysis result for the medical image,
   based on reference information indicating whether or not the analysis result has been referenced by a user, in a case where the analysis result has been referenced and an instruction to display the medical image is given, display an annotation representing the analysis result in addition to the instructed medical image, for the referenced analysis result, manage a set value indicating whether or not to display the analysis result even though there is no instruction to display the analysis result in a case where the user next displays the medical image, in a case where the analysis result is set to be displayed by the set value, display the annotation representing the analysis result in addition to the medical image in a case where the user next displays the medical image, and in a case where the analysis result is set to be hidden by the set value, display only the medical image in a case where the user next displays the medical image.

2. The medical image display apparatus according to claim 1, wherein the reference information is managed in a unit of a user.

3. The medical image display apparatus according to claim 2, wherein the reference information is further managed in a unit of a group including a plurality of users.

4. The medical image display apparatus according to claim 3, wherein the at least one processor is configured to:
in a case where an instruction to display a medical image to which the analysis result has been referenced for all the users included in the group is given by the user included in the group, display the annotation representing the analysis result in addition to the instructed medical image, and in a case where an instruction to display a medical image to which the analysis result is unreferenced for at least one user included in the group is given by the user included in the group, display only the instructed medical image.

5. The medical image display apparatus according to claim 1, wherein the at least one processor is configured to display whether or not the analysis result has been referenced for the medical image to be displayed in a visually recognizable manner.

6. The medical image display apparatus according to claim 1, wherein the set value is managed in a unit of a user.

7. The medical image display apparatus according to claim 1, wherein the at least one processor is configured to receive an input of a primary interpretation result by a user interpreting the medical image, display an annotation representing the primary interpretation result, acquire the analysis result for the medical image, display the annotation representing the analysis result, receive an input of a secondary interpretation result by the user interpreting the medical image after displaying the analysis result, and display the annotation representing the primary interpretation result and an annotation representing the secondary interpretation result in a distinguishable manner.

8. The medical image display apparatus according to claim 1, wherein the at least one processor is configured to display the annotation representing the analysis result by superimposing the annotation on an abnormal shadow included in the medical image, or by placing the annotation adjacent to the abnormal shadow.

9. A medical image display method comprising:
displaying a medical image;
acquiring an analysis result for the medical image;
based on reference information indicating whether or not the analysis result has been referenced by a user, in a case where the analysis result has been referenced and an instruction to display the medical image is given, displaying an annotation representing the analysis result in addition to the instructed medical image;
for the referenced analysis result, manage a set value indicating whether or not to display the analysis result even though there is no instruction to display the analysis result in a case where the user next displays the medical image,
in a case where the analysis result is set to be displayed by the set value, display the annotation representing the analysis result in addition to the medical image in a case where the user next displays the medical image, and
in a case where the analysis result is set to be hidden by the set value, display only the medical image in a case where the user next displays the medical image.

10. A non-transitory computer-readable storage medium that stores a medical image display program causing a computer to execute a procedure comprising:
displaying a medical image; acquiring an analysis result for the medical image;
based on reference information indicating whether or not the analysis result has been referenced by a user, in a case where the analysis result has been referenced and an instruction to display the medical image is given, displaying an annotation representing the analysis result in addition to the instructed medical image;
for the referenced analysis result, manage a set value indicating whether or not to display the analysis result even though there is no instruction to display the analysis result in a case where the user next displays the medical image,
in a case where the analysis result is set to be displayed by the set value, display the annotation representing the analysis result in addition to the medical image in a case where the user next displays the medical image, and
in a case where the analysis result is set to be hidden by the set value, display only the medical image in a case where the user next displays the medical image.

* * * * *